Oct. 6, 1964
LE ROY R. BOGGS
3,151,354
APPARATUS FOR MAKING ELONGATED SHAPES
COMPOSED OF FIBER REINFORCED PLASTICS
Filed Sept. 18, 1961
7 Sheets-Sheet 7
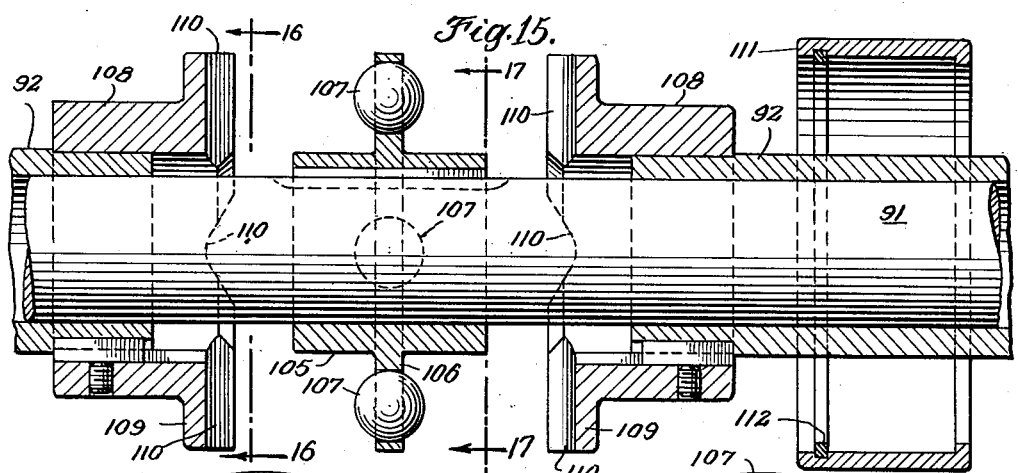
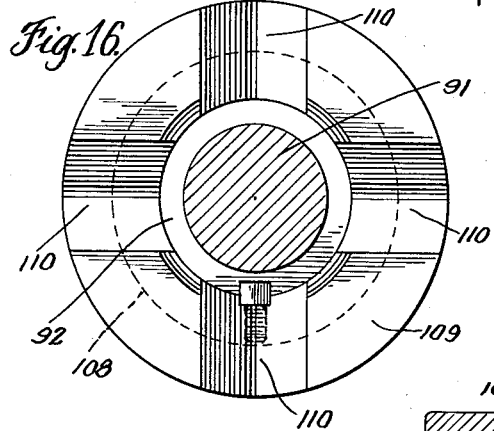
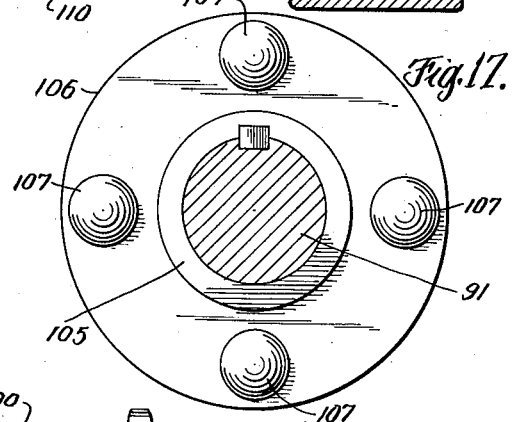
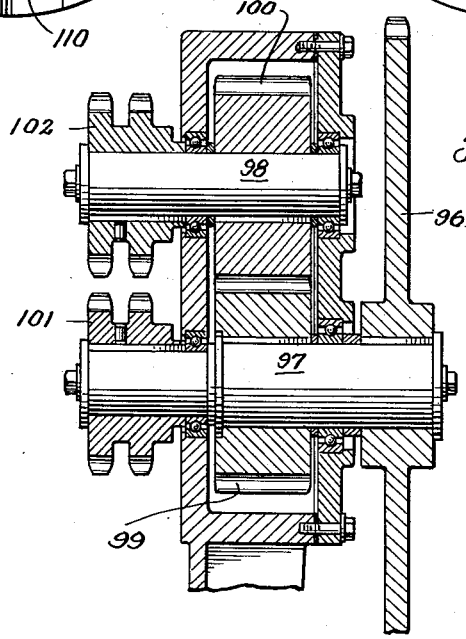
INVENTOR
LeRoy R. Boggs
BY
ATTORNEYS

United States Patent Office 3,151,354
Patented Oct. 6, 1964

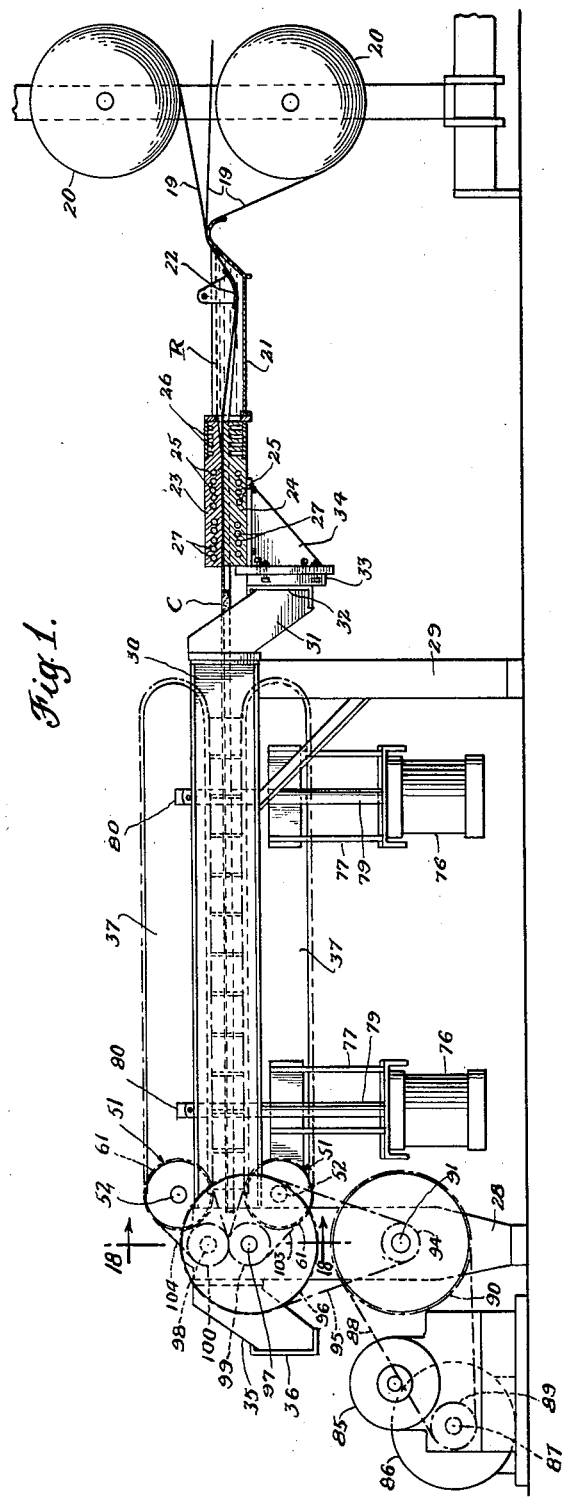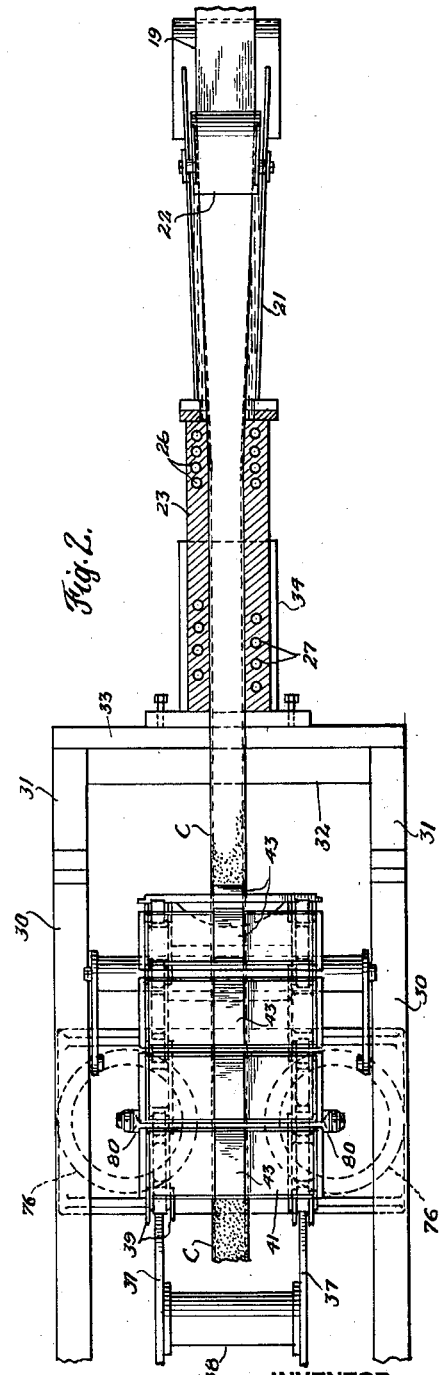

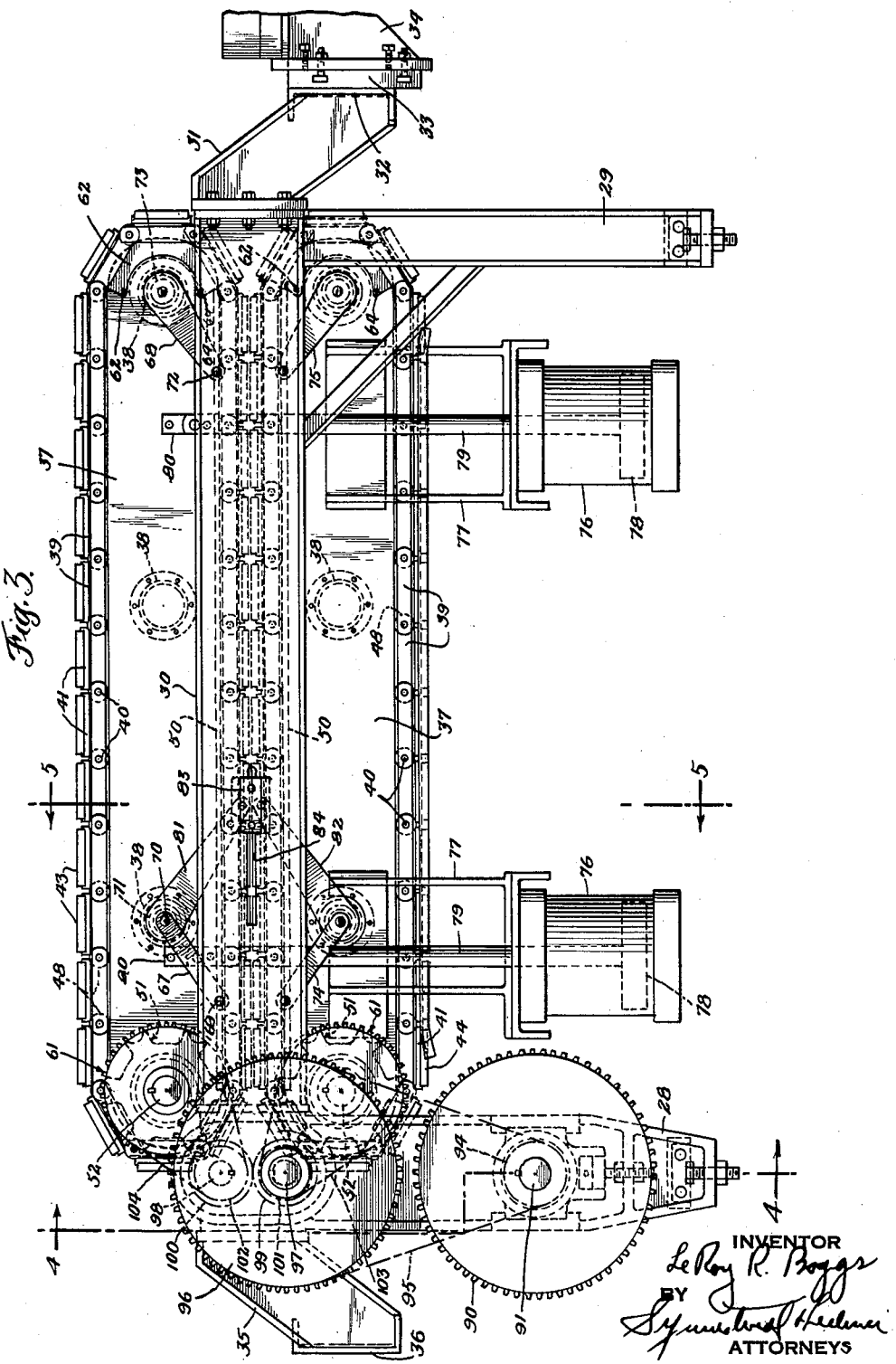

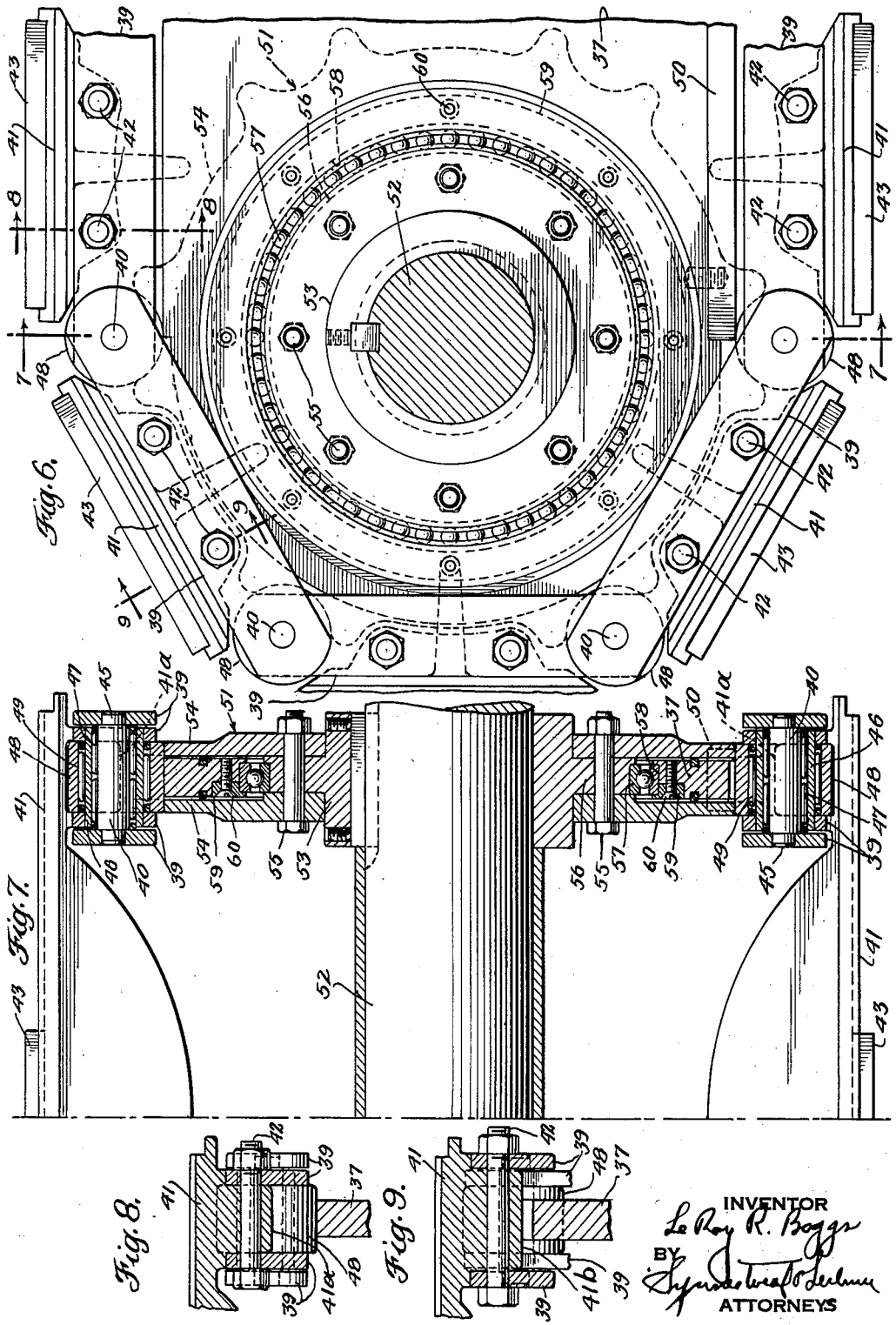

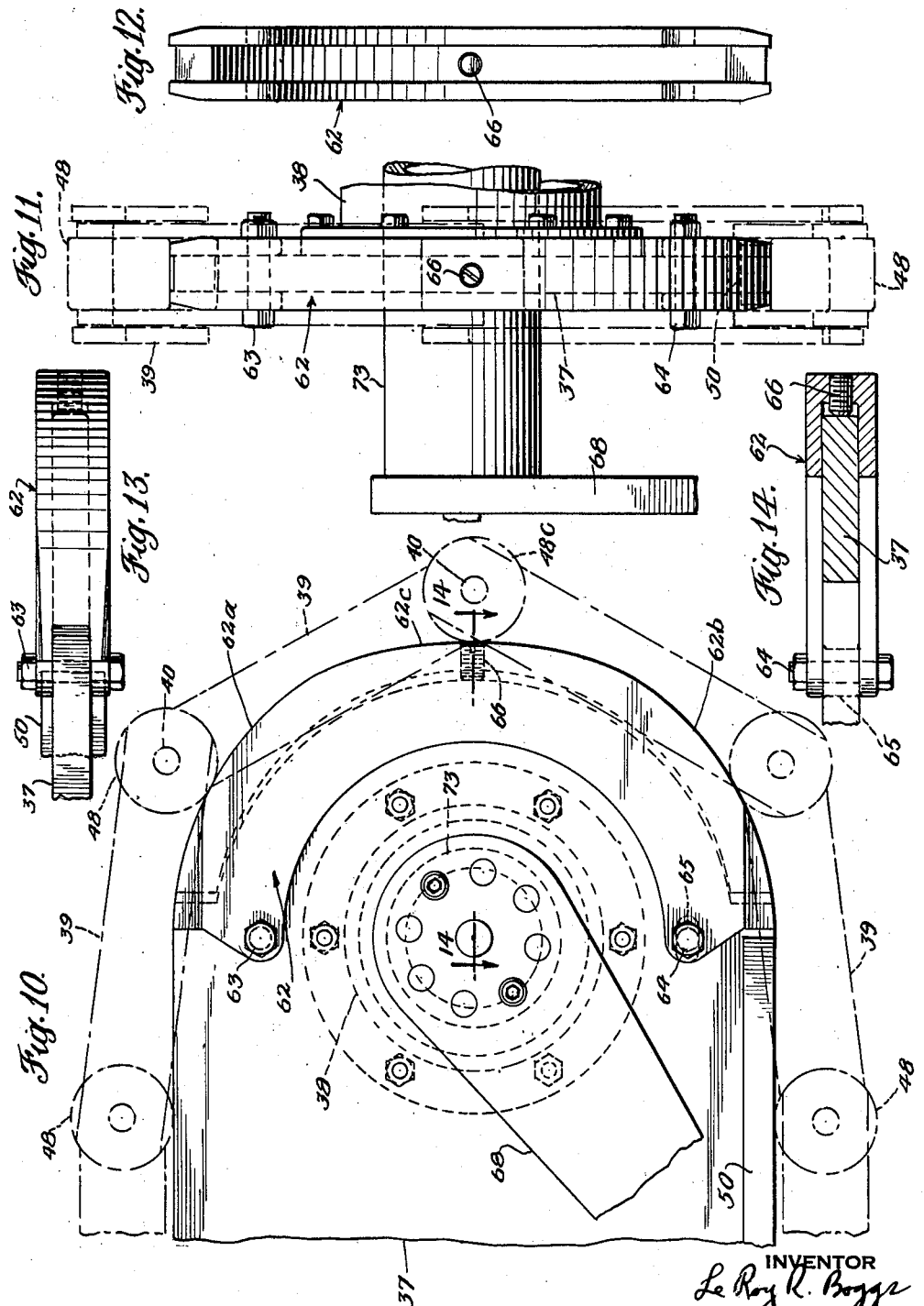

3,151,354
APPARATUS FOR MAKING ELONGATED SHAPES COMPOSED OF FIBER REINFORCED PLASTICS
Le Roy R. Boggs, Bristol, Tenn., assignor to Universal Moulded Fiber Glass Corp., Bristol, Va., a corporation of Delaware
Filed Sept. 18, 1961, Ser. No. 142,749
22 Claims. (Cl. 18—4)

This invention relates to apparatus for use in making elongated shapes or articles composed of plastic materials, particularly plastic materials containing reinforcing elements. The invention is especially applicable to apparatus or equipment for use in making such shapes or articles from heat hardenable or thermosetting type materials having elongated reinforcing elements embedded therein, such as fibrous materials, especially glass fiber reinforcements.

The present application is concerned with equipment of the general type disclosed in my copending application Serial Number 115,633, filed June 8, 1961, and the present application is in the nature of a continuation-in-part of said prior application, the invention of the present application utilizing certain of the devices in said prior application and also certain additional structure or structural arrangements, as will further appear. Certain features disclosed but not claimed in the present application are disclosed and claimed in said copending application Serial No. 115,633; and some features disclosed but not claimed herein are also disclosed and are claimed in my copending applications Serial No. 2,760, filed January 15, 1960 and Serial No. 44,050, filed July 20, 1960.

In accordance with said prior application, a fiber reinforcement, for instance glass fiber mat, strip or rovings are fed through a bath or reservoir of a heat hardenable or thermosetting resin in liquid state, to thereby impregnate the fiber reinforcement with the resin. The impregnated reinforcement is then passed into the entrance end of a confining passage in a forming device or die structure, the entrance end portion of which is preferably tapered to an inlet opening of increased cross sectional area. The die passage also has a portion of uniform cross sectional area following the tapered inlet portion in which the materials passing through the system are heated sufficiently to effectively harden the resin and solidify the formed article. Beyond the exit end of the confining passage of the die structure a puller mechanism is arranged, which puller mechanism engages the solidified formed article and pulls the article from the die structure and also serves to advance the materials from which the article is being formed into and through the die structure. Advantageously the tapered inlet end portion of the die is cooled so as to avoid any appreciable setting or curing of the resin prior to reaching the portion of the confining passage of uniform cross section.

Such a process, as is mentioned in the application above referred to, is adaptable to the production of articles or shapes of a variety of types, such as rods, slabs, channel pieces, pipe, or other tubular structures and the like.

The present invention is particularly concerned with certain portions of equipment for the carrying out of a method or process of the type briefly described above and also more fully described in the copending application above referred to. More specifically the invention is concerned with the puller mechanism for engaging the solidified piece beyond the exit end of the forming device and for pulling the article being formed through and out of the die. The invention is particularly concerned with a puller mechanism incorporating a pair of puller devices somewhat in the nature of crawler treads, and among some of the more important objects of the invention are the following:

First, note that in an operation of the general kind referred to above and especially where relatively large shapes are being made or where the shapes being made are of complicated cross section, a very powerful pull is required in order to deliver the formed article from the die structure and advance the materials being formed through the die structure. By way of example, with various articles of substantial size or complicated cross section a force of the order of from 10 to 50 tons is required. The delivery of forces of such magnitude from a power source to the crawler treads presents a substantial problem, and in accordance with the invention provision is made for employment of two driving trains, instead of a single driving train, from the power source to the crawler tread mechanism, each drive train including gearing or chains or both. In a system of this kind it is an object of this invention to provide for substantially equal distribution of the load or force between the two drive trains, this being accomplished according to the invention by the introduction of a differential drive device between the power source and the two drive trains.

The invention also contemplates a differential of special construction for this purpose as will further appear.

In accordance with another aspect of the invention, the crawler tread devices are provided with mounting means by which both of the opposed crawler tread devices are shiftably movable toward and away from each other and toward and away from the path of feed from the articles being formed which are gripped between the crawler treads. This provision for shifting motion permits adjustment of the devices to enable them to engage articles of different thickness or size while still retaining a given relationship to the feed path or axis.

According to the invention, a mechanism, for instance a pneumatic mechanism, is used to urge the two crawler tread devices toward each other in order to grip or engage the solidified article and thus provide for delivery of substantial pull to the article in the feed path, and these pneumatic pressure devices are connected with the frame structures for the crawler treads so as to float therewith and thus provide for delivery of the gripping pressure, not withstanding the fact that neither of the crawler treads bears a predetermined fixed positional relationship to the frame structure of the apparatus.

In accordance with still another aspect of the invention, the crawler tread devices are made up of a plurality of pivotally connected tread links, in the general manner of chain links, and drive sprockets are provided for each crawler tread, the drive sprockets being arranged at one end of the continuous loop of one tread and engage the pivots or pins by which the links of the tread are interconnected. At the same time, the invention contemplates the employment of curved shoes or guide plates at the opposite end of the endless loop of each tread mechanism. By the employment of curved shoes in this manner, drive sprockets need be provided at only one end of each tread mechanism.

In an arrangement of the kind just described the invention further contemplates the location of the drive sprocket at the end of the tread mechanism remote from the forming device from which the article is being drawn, the shoe being located at the end of the tread device adjacent to the forming device. By virtue of the relative position of the sprocket and shoe, the shoe is relieved of excessive pressure or friction loads, since the only length of the path of travel of the tread links which carries the load is the run thereof from the forming device to the driving sprocket.

In considering still another aspect of the invention it is first noted that in traveling around the drive sprockets, the tread links actually form a polygon in view of which in the travel of the crawler tread through a distance corresponding to the length of each tread link, there is generated a cycle of slackening and tightening in the crawler tread. This tendency is overcome in accordance with the present invention by employment of the curved plates or shoes at the opposite end of the tread and by providing a specially developed curve on the bearing surface of those shoes so as automatically to compensate for the tendency of the sprocket action to periodically shorten and lengthen the tread loop. In consequence, substantially uniform tension is maintained in the crawler tread, without the necessity for employment of any yielding or resilient slack take-up devices.

Still other objects of the invention include the formation of the tread links in a special way so as to minimize the number of parts required for a given tread mechanism, and the arrangement of the various of the mounting and driving parts in a sturdy manner so as to effectively carry the heavy pulling loads required.

How the foregoing and other objects and advantages are attained will appear more fully in the following description referring to the accompanying drawings which illustrate a preferred embodiment of the equipment and in which:

FIGURE 1 is a more or less diagrammatic outline and sectional elevational view of an apparatus constructed according to the present invention, this view showing supply reels for fiber reinforcement, a resin reservoir for impregnating the reinforcement, a forming device having a confining passage therein and a puller mechanism arranged according to the present invention;

FIGURE 2 is a plan view, with certain parts in horizontal section, of portions of the apparatus shown in FIGURE 1, FIGURE 2, however, being drawn on an enlarged scale;

FIGURE 3 is a still further enlarged side elevational view of the puller mechanism shown in FIGURES 1 and 2;

FIGURE 6 is a further enlarged fragmentary face view of a driving sprocket for the upper crawler tread of FIGURE 3, with certain parts omitted to better show those lying behind;

FIGURE 7 is a transverse sectional view taken as indicated by the section line 7—7 on FIGURE 6;

Figure 4:
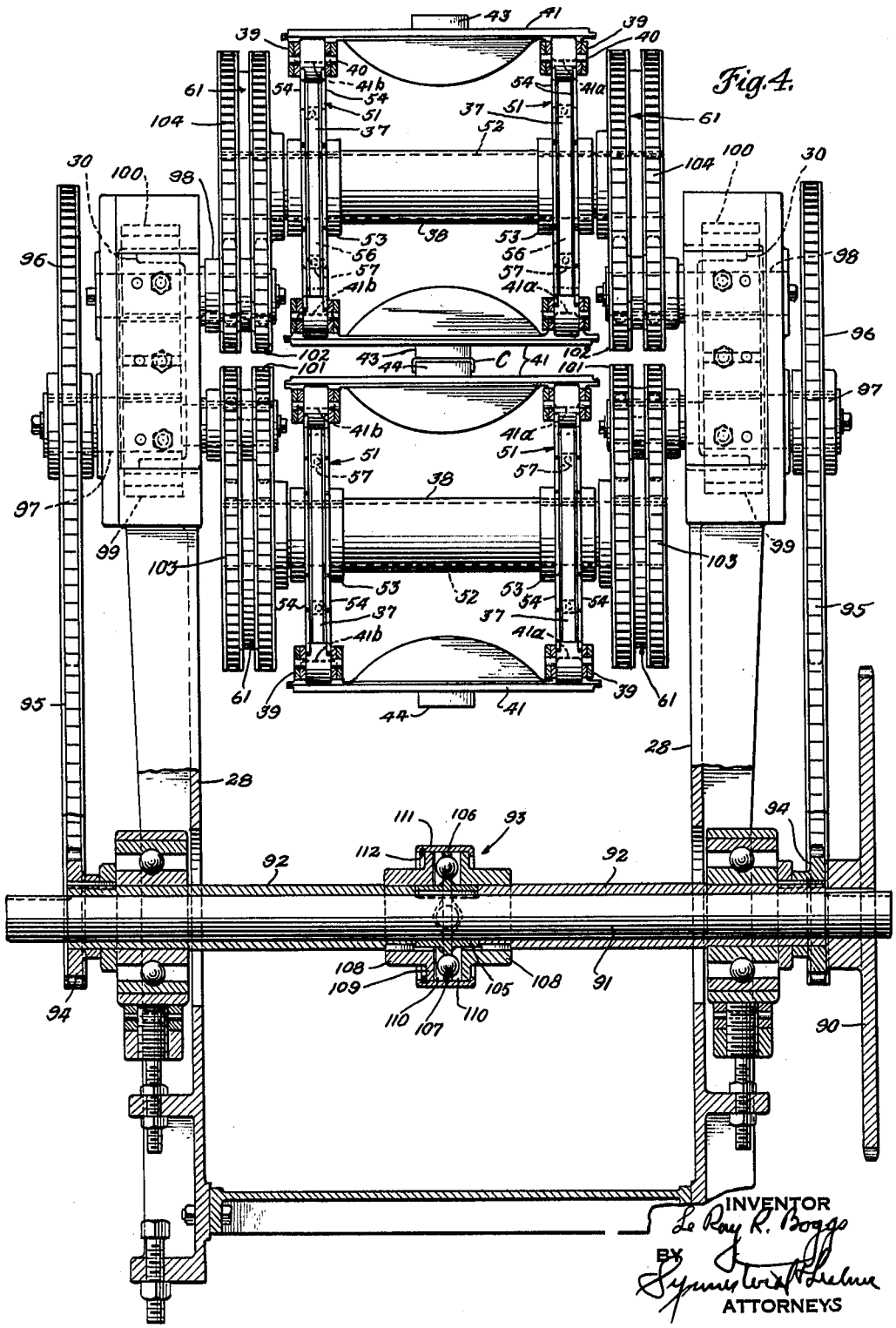
FIGURE 4 is an enlarged cross section through the drive system for the puller mechanism, taken as indicated by the section line 4—4 in FIGURE 3, but further showing the crawler treads in section taken on the center lines of the driving sprockets.

FIGURES 8 and 9 are sectional views of certain details taken as indicated by the section lines 8—8 and 9—9 on FIGURE 6;

FIGURE 10 is a fragmentary face view of the right hand end of the upper crawler tread shown in FIGURE 3, with the tread chain links indicated in dot and dash lines in a position advanced a distance equal to one half the length of a link from the position of FIGURE 3, this view particularly illustrating one of the curved shoes or guides which cooperate with the crawler tread at one end of its closed loop;

FIGURE 11 is an end view of parts shown in FIGURE 10, looking toward the left, and with the tread chain links in dot and dash lines;

FIGURE 12 is a view of certain details of an adjustment mechanism associated with parts shown in FIGURES 10 and 11, the view being taken looking toward the right in FIGURE 10;

FIGURE 13 is a plan view of parts shown in FIGURE 12;

FIGURE 14 is a view of certain details taken as indicated by the section line 14—14 on FIGURE 10;

FIGURE 15 is an exploded view of the differential coupling included in the drive mechanism, as shown toward the lower central portion of FIGURE 4;

FIGURES 16 and 17 are sectional views taken as indicated by the section lines 16—16 and 17—17 on FIGURE 15; and FIGURE 18 is a section through a portion of one of the drive trains from the power source to the crawler treads, the view being taken as indicated by the line 18—18 applied to FIGURE 1.

In considering the equipment illustrated in the drawings, it is first noted that the general arrangement of most of the parts as shown for example in FIGURES 1 and 2 conforms quite closely with the arrangement of the corresponding parts illustrated in FIGURES 12, 13 and 14 of my copending application above referred to. As in said prior application, the embodiment of the equipment here shown is adapted to the production of a channel piece, the shape of which appears to best advantage in FIGURES 4 and 5 and is indicated by the letter C, but which is also shown in various other figures including FIGURES 1 and 2. The channel piece here shown may, for example, be of a width of the order of about four inches, with the channel flanges in the neighborhood of one inch high.

Referring now to FIGURES 1 and 2 there is here given a brief description of the general arrangement and operation of the equipment there shown.

The reference numeral 19 indicates fiber reinforcement strips, for instance glass fiber mats, three such strips being shown in FIGURE 1, these being supplied from suitable strip reels, two of which are shown at 20, 20. These fiber reinforcement elements are fed into the resin indicated at R in FIGURE 1 which comprises a liquid resin bath or reservoir contained within the resin pan 21, a guide 22 being provided under which the strips 19 pass to effectively and thoroughly submerge them in the resin in the pan and thus insure thorough impregnation of the strips with the resin.

As hereinabove mentioned the resin is of the heat hardenable or thermosetting type and in the resin pan 21 it is present in the liquid state.

Figure 5:
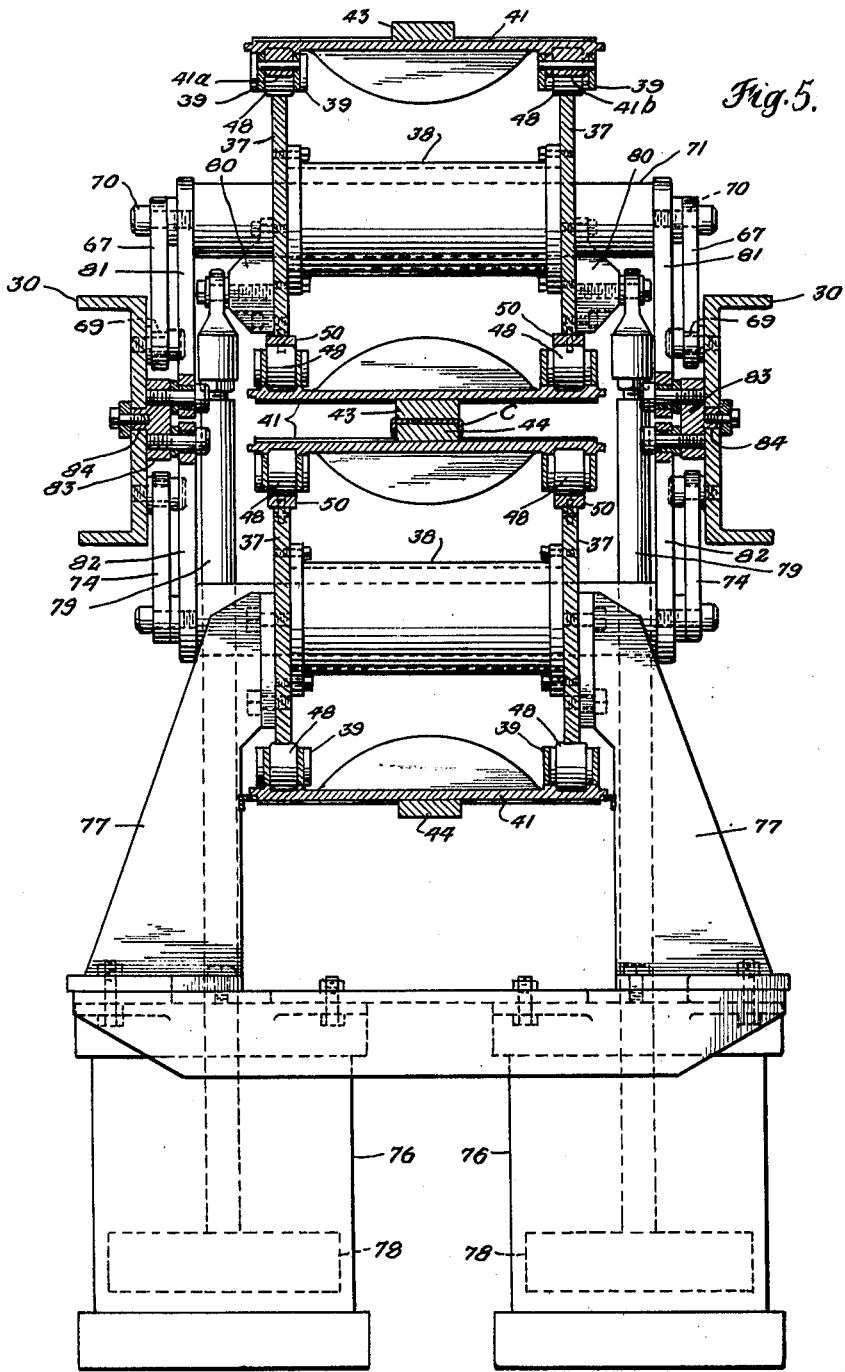
FIGURE 5 is a transverse sectional view taken as indicated by the line 5—5 on FIGURE 3, this figure also being shown on an enlarged scale.

The forming device or die structure includes upper and lower die parts 23 and 24 which are shaped to interfit and, in the embodiment illustrated, provide a channel shaped confining or forming passage therebetween, for instance a passage of the general cross section of the article indicated at C in FIGURES 4 and 5. As the strips 19 advance through the resin pan 21 from the guide 22 to the entrance end of the die passage, the edges of the strips are folded down so as to form reinforcements in the flanges of the channel being made. The entrance end of the passage in the forming device is flared to an enlarged inlet opening, whereby the impregnated fiber reinforcement is compressed, with expulsion of excess resin back into the reservoir 21. Beyond the flared or tapered inlet portion of the confining passage, the passage between the die parts 23 and 24 is of substantially uniform cross section, and it is in this portion of the die passage that heat is applied to harden the resin and solidify the article while the impregnated reinforcement is under pressure therein. The heating may be effected in a variety of ways, for instance by electrical heating inserts such as indicated at 25 which are arranged in the die parts 23 and 24 in the mid portion thereof, but beyond the tapered inlet end portion of the die passage. The inlet end portion of the die parts are desirably provided with passages such as indicated at 26 for the circulation of a cooling liquid so as to maintain the resin temperature in the die passage at a temperature below the curing or setting temperature, and thus avoid premature hardening of the resin in the tapered portion of the die.

The exit end portion of the die is also desirably provided with passages 27 for the circulation of a cooling liquid, so as to reduce the temperature of the solidified article before delivery thereof from the exit end of the die passage. Preferably the temperature is reduced to a point below the heat distortion point of the resin used.

The forming device as a whole is mounted at one end of a puller mechanism which is shown to the left in FIGURES 1 and 2.

The puller mechanism incorporates two crawler tread devices which are arranged to grip the solidified article C therebetween and draw the article from the die and also draw the materials into and through the die passage. The puller mechanism is built up on a main or supporting frame structure including the upright frame elements 28 and 29 which carry the horizontal channel members 30, 30 (see FIGURES 1, 2, 3 and 5) which latter have at one end (toward the right in FIGURES 1, 2 and 3) downwardly extended bracket members 31 which are interconnected by the transverse structure 32 carrying an abutment or thrust plate 33 on which the bracket structure 34 is adjustably mounted as is more fully described and explained in my copending application above referred to. The details and purposes of that adjustment need not be considered herein, as they form no part of the present invention per se. However it is here to be noted that the mounting of the forming die on this thrust structure 31, 32 and 33 provides for transmission of the heavy thrust loads involved in pulling the shape from the forming die directly from the die structure to the main frame of the puller mechanism, and further that the forming die is thereby mounted with its forming passage in a predetermined relation to the main frame structure of the puller mechanism.

At the other end of the puller mechanism (to the left in FIGURES 1 and 3) downwardly inclined brackets 35 are provided, similar to those identified by the numeral 31 at the other end. The brackets 35 are interconnected by a transverse structure 36, which serves to interconnect the frame elements. The two crawler treads are mounted on the main frame or channel members 30 in the manner which will be described hereinbelow, but reference is now first made to the construction of the crawler treads themselves.

As the two crawler treads are of essentially the same construction, only one of them will be described in detail, and for this purpose reference is made principally to the upper crawler tread illustrated in FIGURES 1 to 5 inclusive, certain detailed parts also being shown in FIGURES 6 to 12 inclusive.

Each crawler tread device includes a pair of side plate or frame members 37—37. The two side plates 37 are rigidly interconnected by sleeves such as shown at 38 in FIGURES 2, 3, 5, 10 and 11, in order to build up a rigid crawler tread frame adapted to carry the traveling tread elements to be described.

The tread structure is made up of two sprocket type chains each composed of pairs of pivotally interconnected links 39 as shown for example in FIGURES 2, 3, 6, 7, 10 and 11. The links 39 of the chains are interconnected by means of pivots 40. The two chains serve to carry, and are tied together by, cross bars or tread link devices 41. The cross bars are fastened to the chain links by means of bolts as indicated at 42, these interconnections being clearly shown in FIGURES 6, 8 and 9.

The cross bars 41 serve to carry gripping blocks or the like such as indicated at 43 on the upper crawler tread. Similar blocks 44 are carried by the cross bars 41 of the lower crawler tread as is clearly shown in FIGURE 5 and the blocks 43 and 44 are arranged to grip the piece or shape being formed, for instance the channel C as is shown in FIGURE 5, in order to advance the materials through the forming device and draw the shape from the confining passage of the die structure. For this purpose the blocks 43 and 44 may advantageously be covered, lined or coated with a friction material, for instance a layer of rubber adhesively applied, or a coating of a friction material-containing composition. The blocks themselves may advantageously be formed of wood and may be fastened to the cross bars in any suitable manner, either by the use of bolts counter sunk in the working face of the blocks or otherwise keyed or embedded therein so as not to project at the gripping surface of the block. In the particular embodiment illustrated (see for example FIGURES 4 and 5) the blocks 43 for one tread are of essentially the same size and shape as the blocks 44 for the other tread, one block engaging the outer surface of the web of the channel being formed and the other block engaging the inner surface of the channel or web. With other shapes of articles being formed, the blocks on the two crawler treads will desirably be of other shapes, according to the cross section of the piece being made, in order to effectively grip the piece. In the case of a rod or cylindrical shape being made, the blocks are desirably provided with approximately hemispherical grooves struck on radii such as to engage the curved surface of the pieces. Advantageously the two crawler treads are driven in such synchronized relation to each other that the blocks carried by the respective cross bars of the two treads register with each other in order to provide effective gripping of the piece being drawn by the pairs of directly opposed gripping blocks.

As best seen in FIGURES 6 and 7, the pivots 40 for interconnecting the chain or tread links 39 are provided with reduced end bearing portions 45 which are journaled in the outer links 39 of a given joint. The pin 40 itself carries a sleeve 46 which is mounted on the pin by means of needle bearings 47 and the sleeve 46 is journaled in the inner links 39 of that joint. The sleeve 46 also carries a roller 48, this roller being mounted on the sleeve 46 by means of needle bearing 49. The rollers 48 of the several pivotal joints between the tread links are adapted to be supported and guided by the upper and lower edges of the side frame plates 37 of the crawler tread structure. Bearing strips 50 are provided at the lower edges of the frame plates 37 for the upper crawler tread and at the upper edges of the frame plates 37 for the lower crawler tread. By virtue of this arrangement of the rollers 48, the tread links and the gripping blocks are provided with effective and accurate backing throughout the runs of the crawler treads in which the shape or piece being formed is gripped. The strips 50 also provide wear resisting surfaces at the edges of the frame plates 37.

At one end of each of the crawler treads (the left hand end as viewed in FIGURES 1 and 3), a pair of driving sprockets 51 are provided. The sprockets of the pair are connected with a common driving shaft 52 and each sprocket is built up of several parts including a hub part 53 which is directly keyed to the shaft 52, and a pair of sprocket pieces 54 which latter are bolted to the hub piece 53 by means of bolts 55. The outer peripheries of the sprocket pieces 54 are shaped to provide teeth or sockets for engaging the rollers 48 and thereby transmit the drive for the crawler mechanism from the shaft 52 to the tread links.

The sprockets 51 of each tread mechanism are mounted or journaled on the frame plates 37 of that tread mechanism by parts now described with reference to FIGURE 7. The hub piece 53 of each sprocket is provided with a shouldered circular web 56 for receiving the inner race of the large diameter ball bearing 57. The outer race of this bearing is seated in a circular opening 58 formed near the end of one of the frame plates 37 and the bearing and the frame plate are retained in their proper relationship by a retainer ring 59 fastened by a series of screws 60. Thus the two sprockets 51 and the driving shaft 52 are journaled together as an assembly at one end of the crawler frame plates 37.

The sprocket shaft 52 is adapted to be driven at both of its ends, by means of separate drive trains, which in the embodiment shown include multiple chain sprockets 61, one such multiple chain sprocket being arranged at each end of shaft 52, as seen for example in FIGURE 4. The drive trains for delivering power to the sprockets 51 will be described hereinafter but reference is first made to other features of the crawler treads themselves, as follows:

Toward the right hand end of each crawler tread as viewed in FIGURES 1 to 3, instead of providing sprockets for guiding or mounting the rollers 48 and the tread links, I prefer to employ specially formed curved shoes or guiding plates 62. This is best shown in FIGURES 3 and 10 to 14 inclusive. One end of each curved shoe 62 is mounted by means of a fastening bolt 63 to a side frame member 37 (see FIGURES 3 and 10). The other end of the curved shoe is provided with a bolt 64 extending through a slot 65 in the plate 37 providing for adjustable positioning of the shoe, by pivotal motion thereof about the axis of the bolt 63. The inset set screw 66 cooperating with the shoe itself and with the adjacent curved end of the frame plate 37 serves to adjustably shift the shoe 62 about the pivot bolt 63. After making an adjustment, the bolt 64 will be tightened to retain a given setting. As best seen in FIGURES 13 and 14, the shoe 62 is internally channeled so as to embrace the end portion of the frame plate 37. The outer curved edge of the shoe 62 constitutes a guide surface for the rollers 48 which are mounted on the pivot interconnections 40 of the chain links 39. From inspection of FIGURE 10 it will be noted that the curvature of the outer surface of the shoe 62 is not a simple regular arc struck with a single radius. On the other hand it is a curvature which has been specially developed for the following purposes.

Having in mind that at the opposite end of the tread mechanism the rollers 48 carrying the tread links engage in the teeth of the driving sprockets 51, it will be seen that as the chain or tread links enter from a straight run into the curved run around the sprocket that the effective length of the crawler tread alternately increases and decreases in a cycle represented by a distance of travel of the tread equal to the length of a single link or tread. This results in a tendency to slacken and tighten the crawler tread structure as a whole. The curvature of the bearing surface of the shoe 62 is so developed as to automatically compensate for this tendency for the tread structure as a whole to lengthen and shorten during its travel through each increment represented by the length of a tread link. This is most clearly shown in FIGURE 10 in which it will be seen that the portions of the bearing surface of the shoe 62 in the neighborhood of the reference characters 62a and 62b are struck with a substantially uniform radius, whereas the portion of the bearing surface in the central region of the shoe indicated at 62c is struck on a larger radius, i.e. is flatter, so that the roller 48c which is riding on that part of the shoe in the position of FIGURE 10, is not held out as far as it would be if the curve of parts 62a and 62b were continued throughout the entire arc of the shoe.

As hereinabove mentioned FIGURE 10 illustrates the tread advanced one half the length of a tread link as compared with certain other figures, for instance FIGURES 3 and 6.

The tendency of a sprocket drive to cause cycles of lengthening and shortening of a chain or crawler tread increases with increase in the length of the links in relation to the diameter of the sprocket. Thus in many sprocket drives where the length of the links is small in relation to the diameter of the sprockets this tendency may be inconsequential. However, for the present purposes it is preferable to use links of considerable length in relation to the diameter of the sprockets in order to reduce the number of parts required and also to make possible the employment of gripping blocks of substantial size.

According to the invention, the use of the sprocket at one end of the crawler tread and of a curved shoe at the other end permits the employment of links of considerable length, without running into the problem of extensive slackening of the crawler tread periodically with the motion of the tread through each increment increasing to the length of the tread links. The drive is thereby improved and danger of disengagement of the rollers 48 from the sprocket teeth is eliminated.

Still another important aspect of this matter lies in the fact that the invention provides for the use of a curved shoe toward that end of the crawler tread which is located adjacent to the forming device from which the shape or article is being delivered, the sprocket being located at the end of the crawler tread remote from the forming device. By arranging these parts in this way, the bearing loads and wear problem in connection with the rollers 48 riding upon the surface of the curved shoe is greatly reduced for the reason that the only portion of the crawler tread which is under load, i.e. under tension, is the portion in the straight run from the sprocket back to the end of the crawler tread adjacent to the forming device, this being the run which engages the article and pulls it from the forming device. The chain and tread links in the other or return run, and continuing through the curved run around the curved shoe, do not carry heavy pulling loads and therefore do not result in the imposition of heavy loads or forces from the rollers 48 onto the bearing surface of the curved shoe.

Still another feature of importance is the arrangement and shaping of the tread links so that only a single form of link is needed for a given crawler tread. This feature may be explained as follows in reference to FIGURES 4 to 9.

Each cross bar or tread link 41 includes a pair of link engaging lugs, the lug 41a at one end of the cross bar being narrower than the lug 41b at the other end thereof as seen in FIGURES 4, 5, 8 and 9. (Note that because FIGURE 4 is a view looking toward the right and FIGURE 5 is a view looking toward the left the narrow and wide lugs are reversed in these views.) Thus by staggering the side chains the narrower lugs 41a fit between the inner link plates of one side chain and the wider lugs 41b fit between the outer link plates of the other side chain.

This staggering of the chains and the use of the narrow and wide lugs on the cross bars and the alternate reversing of the cross bars end for end enables the use of like cross bars throughout as against providing two sets of cross bars, i.e. one with narrow lugs and the other with wide lugs.

In FIGURE 8 the narrow lugs 41a between the inner link plates of the upper horizontal link of FIGURE 6 is shown and in FIGURE 9 the wider lug 41b between the outer link plates of the adjacent inclined link of FIGURE 6 is shown.

Although the foregoing description of the crawler tread mechanism has been given principally in connection with a single crawler tread structure, the upper one being described for purposes of illustration, the two crawler treads are of essentially the same construction and, as will be seen in the drawings are arranged in a parallel manner so as to grip the articles being formed therebetween.

The crawler treads are each mounted for what may be termed an orbital motion. This mounting for the upper tread mechanism includes mounting structures shown to best advantage in FIGURES 3, 5 and 10. As there seen, at points separated considerably longitudinally of each tread, the tread is provided with mounting arms 67 and 68. The arms 67, one being provided at each side of the mechanism, are pivoted at 69 to the main side frame members 30 of the puller mechanism (see particularly FIGURE 5). The other ends of the mounting arms 67 have pivot joints 70 associated with the outer ends of the transverse structure 71 which extends through the crawler frame plates 37 and projects outwardly at both sides of the crawler structure. Similar arrangements are provided for the arms or links 68 at the opposite end of the structure, one end of each of the links 68 being pivoted as at 72 to the main side frame members 30, and the other end of each link 68 being pivoted as at 73 to a transverse structure similar to the structure 71, extending through the crawler tread frame plates 37. By virtue of these mounting arrangements, the crawler tread as a whole may swing in an arc, being supported by the parallel links 67 and 68.

The other crawler tread, i.e. the lower one as seen in FIGURE 3 is provided with similar mounting links 74 and 75. By virtue of the mounting of the two crawler treads in the manner just described, they are both movable toward and away from the plane or line of pull of the mechanism and thus the crawler treads always retain the proper relationship to the line or axis of feed of the article being formed from the forming device. Forming devices adapted for making articles of a variety of sizes or shapes may therefore be alternately used, while still retaining the desired and proper line of pull of the crawler tread mechanism with respect to the line of feed of the articles out of the die passage of the forming device.

The two tread mechanisms are adapted to be advanced toward each other to tightly engage the piece being formed by means of a pneumatic mechanism including piston and cylinder devices, four being here shown, two toward each side of the puller structure as a whole. As seen in FIGURES 3 and 5 this pneumatic mechanism includes cylinders 76, each of which is mounted by means of a bracket 77 on the side or frame plates 37 of the lower crawler tread mechanism. Pistons 78 are, of course, arranged in the cylinders, and these pistons have stems or rods 79 which are extended upwardly and connected with the side or frame plates 37 for the upper crawler mechanism as by means of mounting brackets 80.

It will readily be understood that by introducing a fluid under pressure, for instance air, into the cylinders 76, the two crawler treads may be forced toward each other and the employment of the set of four piston and cylinder devices provides for application of very high pressures so that pulling forces of great magnitude may be delivered to the articles being formed. The pneumatic devices, it will be noted, are not fixed or fastened to any fixed structure, but are arranged to "float" with the orbital motion of the crawler tread mechanisms. This is important in providing for application of the desired gripping pressure in an arrangement in which the two crawler treads are both movable toward and away from each other so as to maintain a predetermined relationship to a given line of pull, notwithstanding adjustment in the position of the crawler treads.

The motions of the crawler treads are constrained to take place symmetrically and in unison by virtue of additional arms or links 81 and 82, arranged on both sides of the crawler treads. At each side one of these arms is associated with the upper crawler tread and the other with the lower crawler tread. Arm 81 is mounted at one end coaxially of the arm 67 on the pivot 70 of the upper crawler tread (see FIGURES 3 and 5), and arm 82 is mounted at one end coaxially of the corresponding pivot which joins arm 74 to the side frame plate 37 of the lower crawler tread. The opposite ends of each pair of arms 81 and 82 are both pivotally connected with a sliding block 83 which is mounted for reciprocating or sliding motion in slot 84 formed in one of the main frame beams 30. It will be understood that this structure is disposed at both sides of the apparatus as will clearly be seen from FIGURE 5. This arrangement insures that the two crawler tread mechanisms will follow the same motion with respect to the feed path and therefore assures that the line of pull will always be arranged in a given relation to the forming passage of a die mounted in a given position on the apparatus. This relationship is further assured because the forming device is mounted directly on the main supporting frame of the puller mechanism, as are also the two tread frames.

Because of the mounting arrangement of the crawler treads and the pneumatic system for forcing them toward each other, heavy gripping pressures can be developed and in this connection it should be kept in mind that the rollers 48 of the crawler tread mechanism are supported by the bearing strips 50 at the edges of the frame plates 37 throughout the two adjacent straight runs, so that the high gripping pressure may effectively be transmitted through the tread links to the gripping blocks and thus to the article being made.

The drive mechanism for the crawler treads is best shown in FIGURES 1, 3, 4 and 15 to 18 inclusive. The general arrangement of the drive will be seen in FIGURE 1, and as there shown a motor 85 is connected with a reducing unit 86 having an output shaft 87 which serves to drive the chain 88 through a sprocket 89, the chain delivering power to the large sprocket 90 which, as seen in FIGURES 3 and 4, is mounted on the power shaft 91 suitably journaled in the upright frame elements 28 of the mechanism.

Power is delivered from the power shaft 91 to each of two sleeves 92 surrounding the shaft 91 by means of a differential drive device indicated generally in FIGURE 4 by the numeral 93, this differential drive device being shown in greater detail in FIGURES 15, 16 and 17, later to be described.

With further reference to FIGURES 3 and 4, each of the sleeves 92 comprises the initial drive element of a separate drive train extended therefrom to the shaft 52 to which the tread driving sprockets 51 are keyed. The arrangement of the invention provides two separate drive trains in order to enable delivery of very substantial drive loads or torque. Each drive sleeve 92 carries a driving sprocket 94 which is coupled by means of chain 95 with a sprocket 96 mounted on a counter shaft 97, these parts providing for drive of the lower tread mechanism (see FIGURES 3, 4 and 18). Counter shaft 97 is geared to a counter shaft 98 for the upper tread mechanism by means of pinions 99 and 100, so that shafts 97 and 98 rotate in one to one ratio but in opposite directions. Each of the shafts 97 and 98 carries multiple chain sprockets 101 and 102 which are connected by chains 103 and 104 with the multiple sprockets 61 above mentioned and which are connected with the outer ends of the sprocket shaft 52 to which the sprockets 51 are keyed for delivery of the power to the tread device.

The centers of the sprocket shafts 52 and their respective counter shafts 97 and 98 are spaced the same distance as the pivot points at the ends of links 67, 68, 74 and 75 and thus the orbital motion of the treads may take place without interfering with the tread drive.

In this way the shafts 52 for the two tread devices are each driven through separate or independent drive trains, one being driven in one direction and the other in the opposite direction, so that the two crawler treads will be driven or advanced in the proper sense to exert the desired pull on the article being formed.

Because of the practical impossibility of forming two separate drive trains including gearing, sprockets, chains and the like with exact accuracy, if such two drive trains are both "solidly" connected both with the initial power shaft and with the shaft to which the power is being delivered, one or the other of the drive trains would assume most if not all of the load, and the very purpose of providing two drive trains would be defeated.

According to the invention the load or torque carried in each of the two separate drive trains is equalized by the introduction of a differential drive mechanism either at the point where the power from the two drive trains returns to a common drive element or at the point of division of the power from the initial power shaft to the two drive trains. In the embodiment illustrated, this is accomplished by introducing the differential drive device between the main power shaft and the initial elements of the two separate drive trains.

As hereinabove mentioned this differential device is indicated generally by the number 93 in FIGURE 4. This device is shown in greater detail in FIGURES 15, 16 and 17 and reference is now made to those figures. The main power shaft 91 carries a sleeve 105 keyed thereto and having a flange 106 with apertures therein serving as a ball race. A series of balls 107, (four being hereshown) are arranged in this race. At opposite sides of the unit, each of the power sleeves 92 carries a collar 108 having a flange 109 in the face of which four radial grooves 110 are formed, one adapted to cooperate with each of the balls 107. These parts are shown in exploded arrangement in FIGURE 15, and when the parts are brought together as in FIGURE 4, each of the balls 107 in effect is adapted to work in a cavity formed by the grooves 110, there being space or clearance between the walls of the grooves 110 and the balls 107. The parts are adapted to be retained in assembled relation by means of a sleeve 111 having a snap ring 112 as will be understood from inspection of FIGURES 15 and 4.

In operation the balls 107 adjust themselves into positions displaced somewhat toward one side or the other of the mean plane of the ball race 106 according to the relative angular adjustment which the power sleeves 92 and the parts 108, 109 and 110 assume in order to transmit the driving torque or force through the respective drive trains to the sprocket shaft 52.

The arrangement described above comprises in effect a limited differential, i.e. a differential in which limited relative motion is permitted between the two driven sleeves or parts. I have found that with a device of the type shown relative adjustment in the position of the driving parts such as the power sleeve 92 of one drive train with respect to the other, through an angle of something of the order of 10 or 15 degrees may readily take place so as to accommodate any inaccuracy or irregular wear which may develop in the two separate drive trains. Thus at all times the torque delivered through the two drive trains remains the same, and by employing two drive trains in this manner the invention makes possible the delivery of very large driving loads.

Although it will be understood that known forms of differentials may be utilized in the drive system to provide for the torque equalization between the two drive trains, the device described above and illustrated in the drawings is of special advantage for the present purposes since for the present process only limited relative adjustment is needed and such limited adjustment is effectively provided in an exceedingly simple manner by the use of the particular differential drive unit illustrated and described.

The resin material employed, as above indicated is of the thermosetting or heat hardenable type, and preferably comprises a polyester type resin. As is known, such polyester resins, sometimes also referred to as alkyd resins, are formed by reaction of a dibasic acid with a polyhydric alcohol. Those of the reaction products formed in this way which have unsaturation in the molecule are used in the formulation of thermosetting polyester resin materials, the unsaturated reaction product being used in combination with a cross linking agent, usually a monomer such as:

Styrene
Diallyl phthalate
Vinyl toluene
Methyl methacrylate
Triallyl cyanurate

Resin materials of the kind referred to are relatively stable at room temperature and, depending upon the proportions of ingredients, comprise a more or less mobile liquid. When a quantity of the resin material is to be used in the process, a hardener or accelerator is also preferably present, for instance benzol peroxide.

It is also desirable to employ a material such as Carnauba wax dispersed in the resin material, for instance from 1 to 5% of the wax.

The reinforcement may be of the variety of types but in the case of fibrous reinforcements it is advantageously formed of glass fibers which may either be in mat form or in the form of woven fabrics or rovings, or combinations of any of these. Other reinforcing elements may also be present such as metallic wires, strips, angles, or the like, and indeed, insofar as most features of the puller mechanism of the present invention are concerned, metallic reinforcement elements may be used alone. Moreover, the puller mechanism of the present invention may even be used in article forming techniques where no reinforcing elements are present.

However, in the preferred operation some reinforcement is present and the heating of the straight portion of the die, i.e. the portion of the die of uniform cross section is effected in such manner as to completely solidify the piece being formed in this portion of the die. Thus, the piece is formed under a condition in which the reinforcement is in some compression because of the drawing of the materials into the tapered inlet portion of the die, and in view of the foregoing when the piece emerges from the die and is gripped by the puller mechanism it is in solid condition and is capable of transmitting the heavy loads back into the die to the region in which the solidification is occurring, and even back of that point so as to draw the reinforcement from the source of supply, such as the spools 20 and through the resin bath and into the die.

I claim:

1. Apparatus for use in making elongated shapes or articles composed of plastic materials, comprising a forming device having a shaping passage therein in which a liquid resin material is advanced and hardened, puller means adapted to engage the formed and hardened article beyond the forming device to pull the materials and the article being formed through the forming device, a main supporting frame structure for the puller means, the puller means comprising a pair of puller mechanisms adapted to grip the formed article therebetween and movable in a path to effect feed of the article and each of the puller mechanisms having a mounting frame, means mounting the forming device on and in a fixed relation to said main frame structure, and means adapted to mount the frames of the puller mechanisms on the main frame structure for yielding separation and gripping movement with respect to each other and to a path of feed generally in alignment with the axis of the shaping passage in the forming device.

2. Apparatus for use in making elongated shapes or articles composed of plastic materials, comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a pair of opposed crawler treads adapted to grip the formed article therebetween to effect feed of the article, means mounting the crawler treads for separation from and for yielding driving engagement with an article in the feed path from the forming device, and means interrelating the separating and engaging motion of the two crawler treads and providing for equal and opposite separating and engaging motion of the two treads with respect to said feed path.

3. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a pair of opposed crawler treads adapted to engage the formed article therebetween and driven to effect feed of the article, a frame structure for each of the crawler treads, means mounting the crawler tread frame structures including parallel pivotal links providing for orbital motion of the frame structures toward and away from an article in the feed path from the forming device, means interrelating the orbital motions of the crawler tread frame and providing for equal and opposite motion of the two treads with respect to said feed path, and drive mechanism for the crawler treads including means accommodating said orbital motion.

4. In apparatus for use in making elongated shapes or articles composed of plastic materials, which apparatus is of the kind comprising a forming device having a shaping passage therein in which a liquid resin materal is advanced and hardened, puller mechanism adapted to engage the formed and hardened article beyond the forming device to pull the materials and the article being formed through the forming device, the puller mechanism comprising a pair of opposed crawler treads adapted to engage the formed article therebetween and driven to effect feed of the article, means mounting the crawler treads for separation from and engagement with an article in the feed path from the forming device, means interrelating the separating motion of the two crawler treads and providing equal and opposite separating motion of the two treads with respect to said feed path, and pneumatic cylinder and piston devices for urging said treads toward each other having a cylinder connected to move with one of said treads and a cooperating piston connected to move with the other of said treads.

5. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a pair of opposed crawler treads adapted to engage the formed article therebetween and driven to effect feed of the article, driving means for said treads comprising for each tread a tread sprocket with its axle or shaft, a counter shaft and drive means interconnecting said shafts, means mounting the crawler treads including pivotal links of length equal to the distance between said two shafts and arranged to provide for orbital motion of said treads, with each of said tread sprockets with its shaft moving orbitally about the center of its counter shaft, and means interrelating the orbital motions of the crawler treads and providing for equal and opposite motion of the two treads with respect to the feed path of the article from the forming device.

6. Puller mechanism according to claim 5 and further including a fluid pressure cylinder and piston device for urging the two treads toward each other, the cylinder being connected with one of the treads and moving therewith and the piston being connected with the other of said treads and moving therewith.

7. Apparatus for use in making elongated shapes or articles composed of plastic materials, comprising a forming device having a shaping passage therein in which a liquid resin material is advanced and hardened, puller mechanism adapted to engage the formed and hardened article beyond the forming device, the puller mechanism including a crawler tread device having traveling elements adapted to engage the formed article in a path of feed extending beyond the forming device, a drive sprocket for said traveling elements located at the end of the crawler device remote from the forming device, and a curved shoe for guiding said traveling elements at the other end of the crawler device.

8. Apparatus according to claim 7 and further including means for adjusting said curved shoe lengthwise of the crawler tread to compensate for wear.

9. Apparatus for use in making elongated shapes or articles composed of plastic materials, comprising a forming device having a shaping passage therein in which a liquid resin material is advanced and hardened, puller mechanism adapted to engage the formed and hardened article beyond the forming device, the puller mechanism including a crawler tread device having traveling elements adapted to engage the formed article in a path of feed extending beyond the forming device, a drive sprocket for said traveling elements located at the end of the crawler device remote from the forming device, a curved shoe for guiding said traveling elements at the other end of the crawler device, a pivot mounting said shoe toward one end thereof for movement about an axis providing for swinging of said shoe toward and away from the end of the crawler tread, and means for adjusting the position of said shoe about said pivot.

10. Apparatus for use in making elongated shapes or articles composed of plastic materials, comprising a forming device having a shaping passage therein in which a liquid resin material is advanced and hardened, puller mechanism adapted to engage the formed and hardened article beyond the forming device, the puller mechanism including a crawler tread device having tread elements traveling in a closed circuit having a feeding run in which said elements engage the formed article in a feed path extending beyond the forming device, having a return run and further having curved paths interconnecting the ends of said runs, a sprocket defining the curved path at the end of the crawler device remote from the forming device and a curved guide shoe defining the curved path at the other end of the crawler device.

11. Apparatus according to claim 10 and further including driving means for said sprocket.

12. Apparatus for use in making elongated shapes or articles composed of plastic materials, comprising a forming device having a shaping passage therein in which a liquid resin material is advanced and hardened, puller mechanism adapted to engage the formed and hardened article beyond the forming device, the puller mechanism including a crawler tread device having pivotally interconnected tread elements traveling in a closed circuit having a straight feeding run, a return run and curved runs at the ends of the crawler tread interconnecting said feeding and return runs, a drive sprocket guiding said elements in one of said curved runs, and a curved guide shoe guiding said elements in the other of said curved runs, the curved shoe being located in the curved run at the end of the crawler tread adjacent the forming device and the driving sprocket being located at the end of the crawler tread remote from the forming device, to thereby provide for carrying the feeding loads on the drive sprocket and relieving the curved shoe of said feeding loads.

13. Apparatus for use in making elongated shapes or articles composed of plastic materials, comprising a forming device having a shaping passage therein in which a liquid resin material is advanced and hardened, puller mechanism adapted to engage the formed and hardened article beyond the forming device, the puller mechanism including a crawler tread device having pivotally interconnected tread elements traveling in a closed circuit having a straight feeding run, a return run and curved runs at the ends of the crawler tread interconnecting said feeding and return runs, a drive sprocket guiding said elements in one of said curved runs, and a curved guide shoe guiding said elements in the other of said curved runs, the curved shoe being located in the curved run at the end of the crawler tread adjacent the forming device and the driving sprocket being located at the end of the crawler tread remote from the forming device to thereby provide for carrying the feeding loads on the drive sprocket and relieving the curved shoe of said feeding loads, the curved shoe further having its curvature developed to substantially compensate for the tendency of the sprocket to alternately slacken and tighten the pivotally interconnected elements when traveling in the closed crawler tread circuit.

14. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device to pull the materials and the article being formed through the forming device, the puller mechanism including an article engaging element and rotative drive means therefor comprising a first shaft, two driving trains connected with said shaft and each including a driving shaft, a power shaft common to the drive of said two driving trains, and a differential interconnecting said power shaft and the driving shafts of said two driving trains.

15. Apparatus for use in making elongated shapes or articles composed of plastic materials, comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a crawler tread having a driving sprocket at the end thereof remote from the forming device, a sprocket shaft, a power shaft, two driving trains interconnecting said shafts, and mechanism for equally dividing the driving loads between said driving trains including a differential in the connection of said trains to the power shaft.

16. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device to pull the materials and the article being formed through the forming device, the puller mechanism including an article engaging element and rotative driving means therefor, a power shaft, and two driving trains interconnecting the power shaft and said rotative driving means for the article engaging element, said driving trains including differential driving mechanism equalizing the torque transmitted through the two driving trains.

17. Apparatus for use in making elongated shapes or articles composed of plastic materials, comprising a forming device having a shaping passage therein in which a liquid resin material is advanced and hardened, puller mechanism adapted to engage the formed and hardened article beyond the forming device to pull the materials and the article being formed through the forming device, the puller mechanism including a crawler tread having a plurality of article engaging elements pivotally interconnected in a closed circuit, a driving sprocket for said elements located at the end of the tread remote from the forming device, a straight guide for establishing a straight run of said elements, and rollers arranged coaxially of the pivots interconnecting said elements, said rollers and guide being arranged so that the rollers ride on said guide and thus support said elements in a straight run.

18. Apparatus for use in making elongated shapes or articles composed of plastic materials, comprising a forming device having a shaping passage therein in which a liquid resin material is advanced and hardened, puller means adapted to engage the formed and hardened article beyond the forming device to pull the materials and the article being formed through the forming device, the puller means comprising a supporting frame structure, a pair of crawler tread devices each having a mounting frame movably mounted on said supporting frame structure, the crawler treads and their mounting frames being arranged for concurrent movement with respect to the supporting frame structure toward and away from each other to provide for gripping a formed article therebetween and for pulling of such formed article from the forming device in a predetermined feed path, and means mounting the forming device on said supporting frame structure with the shaping passage therein in line with said feed path.

19. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a crawler tread device including a frame plate therefor, a tread sprocket supporting the crawler tread toward one end thereof and comprising a pair of sprocket elements having a common hub member, said sprocket elements being arranged in spaced side-by-side planes at opposite sides of the plane of said frame plate, and a mounting bearing for the sprocket interposed between said hub and said frame plate.

20. In apparatus for use in making elongated shapes or articles composed of plastic materials, which apparatus is of the kind comprising a forming device having a shaping passage therein in which a liquid resin material is advanced and hardened, puller mechanism adapted to engage the formed and hardened article beyond the forming device, the puller mechanism including a crawler tread device having pivotally interconnected tread elements traveling in a closed circuit, said tread elements all being of the same configuration having relatively narrow and wide pivot lugs toward opposite sides thereof and being assembled and pivotally interconnected alternately in reversed positions throughout the series of the crawler tread.

21. Puller mechanism of the kind described comprising a main supporting frame structure, a pair of opposed crawler tread devices each having a frame, the tread frames having link connections with the main frame structure providing for orbital motion of the tread frames with respect to the main frame structure, and driving mechanism for at least one of the treads including a driving sprocket for the crawler tread mounted in the tread frame and orbitally movable therewith, a driving shaft mounted in the main frame structure in a position at the center of the orbital motion of the sprocket, and drive means interconnecting the driving shaft and the sprocket.

22. Apparatus for use in making elongated shapes or articles composed of plastic materials, comprising a forming device having a shaping passage therein in which a liquid resin material is advanced and hardened, puller mechanism adapted to engage the formed and hardened article beyond the forming device to pull the materials and the article being formed through the forming device, the puller mechanism comprising a pair of opposed crawler treads adapted to engage the formed article therebetween and driven to effect feed of the article, each of the treads having a mounting frame, means for mounting each of the crawler tread frames including parallel pivotal links inclined with respect to the path of feed of the article from the forming device to provide for orbital motion of each crawler tread toward and away from the article to be gripped thereby, the pivotal links for the two crawler tread frames being inclined away from each other in a direction toward the forming device, and means interrelating the orbital motions of the crawler tread frames and providing for equal and opposite motion of the two treads with respect to the path of feed of the article from the forming device.

References Cited in the file of this patent

UNITED STATES PATENTS

| Number | Name | Date |
|---|---|---|
| 2,139,405 | Frederickson | Dec. 6, 1938 |
| 2,179,923 | De Lavaud | Nov. 14, 1939 |
| 2,496,911 | Green | Feb. 7, 1950 |
| 2,591,304 | Schuller | Apr. 1, 1952 |
| 2,729,118 | Emslie | Jan. 3, 1956 |
| 2,741,294 | Pancherz | Apr. 10, 1956 |
| 2,745,491 | Sonneborn et al. | May 15, 1956 |
| 2,782,458 | Emmert et al. | Feb. 26, 1957 |
| 2,806,248 | Craig | Sept. 17, 1957 |
| 2,871,911 | Goldswarthy et al. | Feb. 3, 1959 |
| 2,948,649 | Pancherz | Aug. 9, 1960 |
| 2,965,217 | Domman et al. | Dec. 20, 1960 |
| 2,977,630 | Balzler | Apr. 4, 1961 |
| 2,983,417 | Swanson | May 9, 1961 |
| 3,002,604 | Brems | Oct. 3, 1961 |